F. A. Werdmüller.
Fishing Net.

Nº 87,740. Patented Mar. 9, 1869.

Witnesses:
C. Raettig
Wm. A. Morgan

Inventor:
F. A. Werdmüller
by Munn & Co.
Attorneys.

F. AUGUST WERDMÜLLER, OF NEW YORK, N. Y.

Letters Patent No. 87,740, dated March 9, 1869.

IMPROVEMENT IN FISHING-NETS.

The Schedule referred to in these Letters Patent and making part of the same.

*To all whom it may concern:*

Be it known that I, F. AUGUST WERDMÜLLER, of the city, county, and State of New York, have invented a new and improved Fishing-Net; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a new apparatus for catching fish, crabs, lobsters, and other animals in deep water; and consists of a rigid frame, which forms the upper edge of a shallow bag, and the outer support for a flat ring, both the bag and ring being woven in suitable material.

When this net is let into the water, and some bait placed into it, it will form a secure trap for the animals entering it, as the same cannot escape, except by direct upward motion, which is scarcely ever attempted, and which is made impossible when the net is being drawn up.

Figure 1:
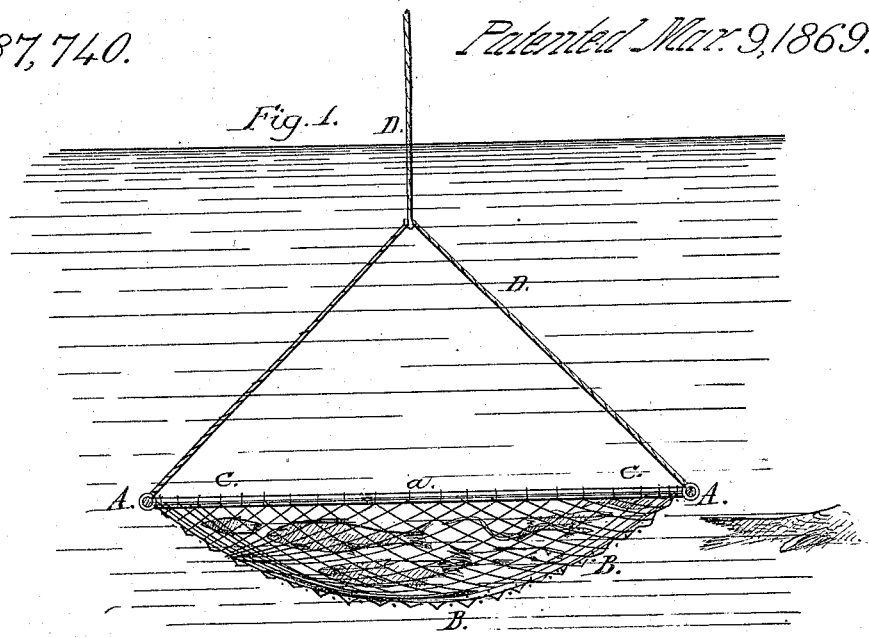
Figure 1 represents a sectional view of my improved fishing-net.

A, in the drawing, represents a frame made of wire, or other suitable material, of square, or other suitable form. To it are fastened the edges of a similarly-shaped sheet, B, of netting, said sheet being large enough to form a shallow bag, as shown in fig. 1.

C is another sheet of netting, stretched within the frame A, so as to be perfectly flat, its outer edges being also fastened to the said frame, as shown.

Figure 2:
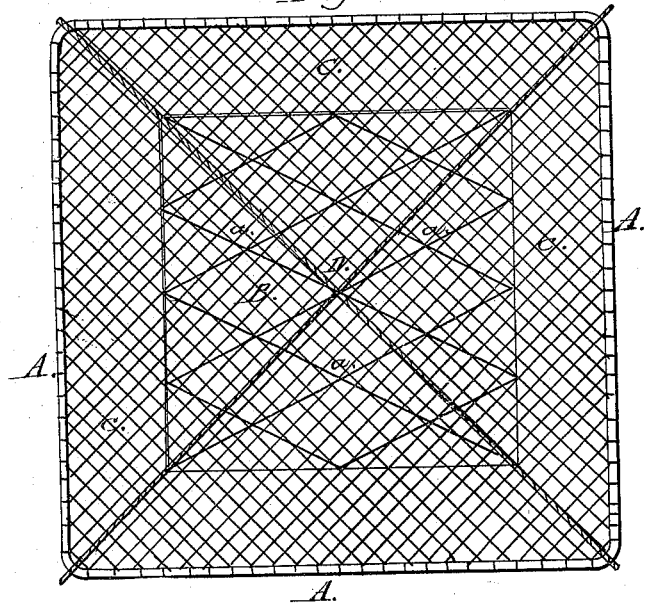
Figure 2 is a plan or top view of the same.

The sheet C has a large aperture in the middle, so as to be only ring-shaped, as in fig. 2, some threads *a a*, which extend across the said aperture, keeping the sheet stretched.

The net thus made is suspended, in a horizontal position, from a rope or ropes D, as indicated in fig. 2. Before it is lowered into the water, some bait is placed into the net, and it is then let down. Fish and other animals attracted by the bait, will enter the net through the upper aperture, and will then be prevented from escaping, by the ring C, through which they will attempt to make their escape.

When the net is being drawn up, the pressure of the water will be strong enough to make escape through the middle aperture utterly impossible.

This net can be used in all kinds of water, for catching all kinds of fish, &c., and can, on account of its strong frame, not readily get out of order.

I claim as new, and desire to secure by Letters Patent—

A fishing-net, consisting of the sheet B, frame A, and annular sheet C, all made and operating substantially as herein shown and described.

The above specification of my invention signed by me, this 11th day of December, 1868.

F. AUG. WERDMÜLLER.

Witnesses:
FRANK BLOCKLEY,
E. GREENE COLLINS.